United States Patent [19]

Weber et al.

[11] Patent Number: 5,310,844
[45] Date of Patent: May 10, 1994

[54] PROCESS FOR THE PRODUCTION OF ORGANYLOXY END-TERMINATED POLYSILOXANES

[75] Inventors: Wilhelm Weber; Karl-Heinz Sockel, both of Leverkusen, Fed. Rep. of Germany

[73] Assignee: Bayer Aktiengesellschaft, Leverkusen, Fed. Rep. of Germany

[21] Appl. No.: 24,550

[22] Filed: Mar. 1, 1993

[51] Int. Cl.$^5$ ............................................. C08G 77/06
[52] U.S. Cl. .................................... 528/14; 528/23; 528/34; 556/467; 556/469
[58] Field of Search ........................ 528/14, 23, 34; 556/467, 469

[56] References Cited

U.S. PATENT DOCUMENTS

| | | | |
|---|---|---|---|
| 4,395,526 | 7/1983 | White et al. | 528/18 |
| 4,705,826 | 11/1987 | Weber et al. | 528/21 |
| 4,748,166 | 5/1988 | Gautier et al. | 528/34 |
| 4,897,459 | 1/1990 | Evans | 528/34 |
| 5,196,497 | 3/1993 | Weber et al. | |

FOREIGN PATENT DOCUMENTS

| | | |
|---|---|---|
| 1305969 | 8/1992 | Canada . |
| 0070786 | 1/1983 | European Pat. Off. . |
| 0069256 | 12/1983 | European Pat. Off. . |
| 0137883 | 4/1985 | European Pat. Off. . |
| 0382365 | 8/1990 | European Pat. Off. . |
| 0457693 | 11/1991 | European Pat. Off. . |
| 0468239 | 1/1992 | European Pat. Off. . |
| 1575067 | 7/1969 | France . |
| 2663941 | 1/1992 | France . |

OTHER PUBLICATIONS

B. V. Molchanov, et al., "Alkoxysiloxanes", Chemical Abstracts, vol. 89, Columbus, Ohio (1978).

*Primary Examiner*—Melvyn I. Marquis
*Attorney, Agent, or Firm*—Sprung Horn Kramer & Woods

[57] ABSTRACT

In the production of a triorganylsily or organodiorganylsilyl end-terminated poly-(diorganosiloxane) by reacting an α,ω-dihydroxypoly(diorganosiloxane) with a tetraorganyloxysilane or organotriorganyloxysilane in the presence of at least one alkali hydroxide, alkali alkoxide or alkali silanolate as a catalyst, the improvement which comprises effecting the reaction also in the presence of additionally at least one alkali metal salt which is soluble in the reactive system.

2 Claims, No Drawings

PROCESS FOR THE PRODUCTION OF ORGANYLOXY END-TERMINATED POLYSILOXANES

Triorganyloxysilyl or organodiorganyloxysilyl end-terminated poly(diorganosilanes) cure into elastomeric silicones in the presence of water, in particular atmospheric humidity, and catalysts. They therefore form the basic material for one-pack sealing and molding compounds which crosslink at room temperature (RTC 1 Plastic Materials).

Di- or tri-organyloxysilyl-poly(diorganosiloxanes) are conventionally produced by the reaction of β,ω-dihydroxypoly(diorganosiloxanes) with tetraorganyloxysilanes or triorganyloxysilanes in the presence of basic catalysts or catalyst systems.

Such catalysts or catalyst systems are: amines (U.S. Pat. Nos. 4,748,166 and 4,395,526) hydroxyl amine derivatives EP-A-70 786) ammonium carbamates (U.S. Pat. No. 4,705,826) mixtures of amines and carboxylic acids (EP-A 137 883).

The stated catalyst systems constitute compromises which exhibit a series of disadvantages. They require long reaction times and/or elevated temperatures. Substantial quantities of the catalyst are predominantly required which can then be removed from the reaction mixtures only with difficulty, so that undesired modifications of the product must be tolerated.

Acting against the, per se desirable, use of highly active alkali hydroxides, which are very efficient in respect of the stated conversion reaction (end termination) is the fact that they bring about polymer rearrangements as an undesirable secondary reaction. These rearrangements can lead to chain scission and ultimately to branched polysiloxanes with an alkoxy group on each of the terminal silicon atoms. However, due to their low reactivity, such end groups are not suitable for the production of RTC 1 plastic materials.

It has thus already been suggested to neutralize the alkali hydroxide catalyst on completion of the conversion reaction by the subsequent addition of acids or acid-releasing substances (EP-A 457, 693, EP-A 468 239) in order to arrest the undesirable secondary reaction in time. Such a manner of proceeding does, however, set considerable demands, particularly when reacting industrial quantities, which demands may be met only with technical difficulty.

It has now been found that the undesirable secondary reaction may be suppressed or so far retarded, thus leaving sufficient time for neutralization of the alkali hydroxide catalyst, if substantially neutral alkali salts which are sufficiently soluble in the reaction medium are present during the end-termination reaction.

The object of the present invention is therefore a process for the production of triorganyloxysilyl or diorganyloxysilyl end-terminated poly(diorganosiloxanes) with tetraorganyloxysilanes or triorganyloxysilanes in the presence of alkali hydroxides, alkali alkoxides and/or alkali silanolates in catalytically active quantities, which process is characterized in that the reaction is performed in the presence of additionally at least one alkali salt which is soluble in the reaction system.

Suitable for the reaction are α,ω-dihydroxypoly(diorganosiloxanes) of general formula (I)

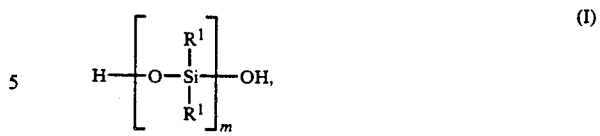

wherein $R^1$ designates a methyl, vinyl, phenyl or 3,3,3-trifluoropropyl group, wherein different $R^1$ groups may be the same or different and m designates such a number that corresponds to a polymer (I) viscosity between 0.01 and 1,000 Pa.s.

Suitable as organyloxysilanes are compounds of general formula (II)

wherein $R^2$ designates an optionally substituted alkyl, alkenyl or aryl group with 1 to 10 C atoms $R^3$ designates an optionally substituted aliphatic or cycloaliphatic hydrocarbon group with 1 to 6 C atoms and n designates the number 0 or 1.

$R^2$ preferably stands for methyl or vinyl and $R^3$ for methyl or ethyl.

The organyloxysilane is used in quantities of 1 to 20, preferably 1 to 10, particularly preferably 1.5 to 6, moles per OH-equivalent of polymer I. Mixtures of tri- and tetrafunctional organyloxysilanes may also be used.

According to the invention, as catalysts there are used alkali hydroxides of formula MeOH or alkali of formula $MeOR^4$, or alkali silanolates of formula $MeO(Si^5_2O)_pR^5$ wherein Me stands for Li, Na, K or Cs, preferably for Na or K, $R^4$ designates an optionally substituted linear or branched alkyl or cycloalkyl group with 1 to 10 C atoms, $R^5$ designates methyl, p designates a number between 1 and 100, preferably 1 to 20, particularly preferably 1 to 5.

The catalyst is used in such quantities that between 0.5 and 1,000 ppm of alkali ions, related to polymer I, are present in the reaction mixture. Concentrations between 0.5 and 10 ppm are sufficient if the raw materials contain no acid constituents. In practice, concentrations between 20 and 200 ppm of alkali ions as catalysts are preferred.

The catalyst is preferably used with a little alcohol as a solvent. The same alcohol is preferably used as is formed in the conversion reaction. Methanol is, however, particularly preferred because the risk of discoloration on storage of the catalyst system is small. The quantity of alcohol used as solvent is not critical. In general, quantities between 0.1 to 0.3 parts by weight, per 100 parts by weight of polymer I, are sufficient. Larger quantities of alcohol are not detrimental.

According to the invention, an alkali metal salt is used as an "anti-catalyst" to inhibit the undesirable secondary reaction. Salts of the alkali metals with the following are suitable:

an optionally substituted, linear, branched or cyclic alkyl carboxylic acid or a polycarboxylic acid with 0 to 30 C atoms, or an optionally substituted aromatic carboxylic acid, or a semi-ester of carbonic acid of general formula R⁶—O(CO)OMe, or an aryl or alkyl sulphonic acid of formula R⁷—SO₂—OMe, or an aryl or alkyl phosphonic acid of formula R⁸—PO—(OMe)₂, wherein R⁶, R⁷ or R⁸ designate an aliphatic or aromatic, optionally substituted hydrocarbon group with 1 to 10 atoms and Me designates the above-mentioned alkali metal ions, preferably Na or K.

The "anti-catalyst" is preferably used in quantities of at least 1 mole of anti-catalyst to 4 moles of catalyst. There is no upper limit to the quantity of anti-catalyst in terms of the conversion reaction. Excessive quantities are, however, undesirable with regard to their remaining in the product. The quantity of anti-catalyst should preferably not exceed 4 moles per mole of catalyst. Particularly preferred is a molar ratio of anti-catalyst to catalyst of 2:1 to 1:2.

The activity of alkali ions in terms of the rearrangement of polysiloxanes is not limited to the reaction here described. The "anti-catalyst" according to the invention is thus generally efficacious for the avoidance of undesirable rearrangement reactions of polysiloxanes in the presence of alkoxysilanes due to the presence of alkali metal bases.

The catalyst system according to the invention consisting of catalyst and anti-catalyst can be added to the reaction mixture in any form. For example, the OH-functional polyorganosiloxane can first be mixed with the organyloxysilane, and then the anti-catalyst followed by the catalyst can be added. The anti-catalyst can also first be mixed with the OH-functional polydiorganosiloxane and the catalyst can be mixed separately with the organyloxysilane and then both reaction partners may be mixed together.

A premixed catalyst system is preferred consisting of catalyst, alcohol, anti-catalyst and part of the organyloxysilane provided for the reaction.

The alkali salts must be sufficiently soluble in the alcohol used or in a mixture of the alcohol and the organyloxysilane. The alkali metal of the salt can be different from the alkali metal of the base. The use of the same metal is, however, preferred. Sodium or potassium are particularly preferred. Which of the two metals is used depends on the reactivity of the alkoxysilane (II). For sparingly reactive silanes, potassium or even caesium compounds are recommended. The use of sodium compounds is preferred for functionalization with reactive silanes, particularly methoxysilanes.

Suitable salts are, for example, salts of alkyl carboxylic acids, including formic acid. Salts of acetic acid or of 2-ethyl hexanoic acid are preferred. Salts of aromatic carboxylic acids, such as benzoic acid or methylbenzoic acid are also suitable. Salts of polycarboxylic acids are often less soluble than salts of monocarboxylic acids. However, the use of semi-ester salts, for example of maleic acid, is favorable.

In practice, the use of semi-ester salts of carbonic acid can be of particular interest. Their formation from alkali alkoxides and carbon dioxide has been described (W. Behrendt, G. Gattow and M. Dräger, Zeitschrift für anorganische und allgemeine Chemie, 397 (1973), 237 to 246). These are water sensitive and thermally labile substances. Under room temperature conditions they are, however, stable. On neutralization after functionalization they decompose forming carbon dioxide and leave no additional extraneous anions behind in the system. In order to produce such a catalyst solution, an alkali alkoxide solution in alcohol and optionally alkoxysilane is conveniently divided into two halves, $CO_2$ is passed into one half until saturation and both solutions are combined.

Further suitable salts are alkali salts of alkyl- or arylsulphuric acids, preferably benzene or toluene sulphonic acid. Salts of perfluoroalkane sulphonic acids may also be used.

Further suitable salts are alkali salts of phosphonic acids, for example alkali salts of methylphosphonic acid or of phenylphosphonic acid.

The catalyst systems according to the invention may contain base and salt in molar ratios of between 4:1 and 1:4. A ratio of between 2:1 and 1:2 is particularly preferred. Exact knowledge of the composition of the polymer (I) is, however, important for the selection of a ratio. All alkali or acid trace constituents of the polymer influence the necessary quantities and quantity ratios. Commercially available polydimethylsiloxanes contain, for example, acid phosphates. Such phosphates, which to simplify can, for example, be described as $KH_2PO_4$, consume base, for example alkali alkoxide, from the catalyst system. This means that the quantity of alkali hydroxide or alkali alkoxide must be correspondingly increased. A similar situation applies to acid constituents of the alkoxysilane, for example HCl residues arising from synthesis. The catalyst systems according to the invention have not only the advantage of suppressing undesirable polymer rearrangements but are also capable of compensating for variations in raw materials. In this manner, a constant course of the process is ensured even if there is a change in the concentrations of acid trace constituents in the raw materials used.

The alkoxysilane used is preferably the same compound that is to be functionalized with the polysiloxane (I).

Preparation of the catalyst system must be performed under dry protective gas. In particular, the uncontrolled ingress of carbon dioxide is to be avoided. It is particularly advantageous to dissolve the solid alkali hydroxide in a mixture of alkoxysilane and alcohol and then carefully incorporate the free acid corresponding to the alkali salt.

Another method of preparation starts, for example, from a methanolic sodium methylate solution, to which is added the salt or the free acid. In this case, the addition of alkoxysilane may be dispensed with.

It is naturally also possible for the performance of functionalization to take the salt with the polymer and the alkoxysilane and optionally alcohol and incorporate the pure base solution. This manner of proceeding generally gives rise, however, to solubility problems and is more difficult to perform.

The catalyst systems according to the invention have the advantage that they rapidly catalyze the desired end-termination process. The end-termination reaction can therefore be performed at room temperature in a short time. The undesirable polymer rearrangement is, however, greatly inhibited in comparison with pure alkali hydroxides or alkali alkoxides. This inhibition facilitates control of the process of functionalization as a long period of time is available for neutralization of the basis catalyst and the undesirable secondary reactions may to a great extent be avoided, even with very reactive alkoxysilanes. In particular, the process makes possible the production of RTC 1 plastic materials from OH functional polydimethylsiloxanes in a single pot process.

The following examples are intended to illustrate the invention in more detail.

Unless otherwise stated, an OH terminated polydimethylsiloxane of viscosity 18 Pa.s was used for the experiments, which was produced with the assistance of acid activated bleaching earth. The polysiloxane produced in this manner was free of acid or alkaline trace constituents. The reactive group content was 0.006 mole SiOH per 100 g of polymer. The alkoxysilanes used contained less than 50 ppm of hydrolyzable chlorine.

EXAMPLES

EXAMPLE 1

The following catalyst solutions were prepared:
Solution A:
0.6 g of solid sodium methylate were dissolved in 38 g of anhydrous methanol under dry argon and gaseous $CO_2$ was introduced into the solution at 23° C. until saturation. The $CO_2$ was first dried.
Solution B:
0.6 g of solid sodium methylate were dissolved in 38 g of anhydrous methanol.
Solution C:
10 g of solution A were combined with 10 g of solution B under dry argon.

25 g of methyltrimethoxysilane were added to 500 g of an OH terminated polydimethylsiloxane of viscosity 18 Pa.s under dry nitrogen. 0.84 g of solution C (catalyst system) were added at 23° C. while the reaction mixture was stirred.

The viscosity profile of the mixture was determined over a period of approximately 60 minutes (Table 1).

Despite the high excess of alkoxysilane, the viscosity of the mixture did not change over a period of 10 minutes. This means that no alteration to the polymer skeleton occurred.

The test was repeated and the following test for SiOH groups were performed after 10 minutes' reaction time: 100 parts by weight of the mixture to be tested were reacted with 5 parts by weight of a test solution. This solution was prepared by dissolving 20% dibutyltin oxide in tetraethoxysilane at 100° C. with exclusion of atmospheric moisture. If a rapid increase in viscosity proceeding as far as gelation occurs after addition of the test solution, this is to be interpreted as an indication of incomplete saturation of the SiOH groups of the OH end-terminated polysiloxane.

No perceptible gelation occurred. The desired end-termination reaction had therefore occurred.

COMPARATIVE EXAMPLE 1a

Example 1 was repeated with 0.42 g of solution B instead of solution C. The viscosity profile is to be found in table 1.

It can be seen from the viscosity profile that viscosity has perceptibly decreased after 10 minutes' reaction time. This means that the polymer skeleton had already been attacked by rearrangement reactions.

COMPARATIVE EXAMPLE 1b

Example 1 was repeated with 0.42 of solution A instead of solution C (Table 1). The viscosity did not change over the entire observation period of one hour. The test for SiOH groups after 10 minutes' reaction time was positive. This means that substantial quantities of SiOH were still present.

TABLE 1

The viscosity values are stated in scale divisions of the measuring device.

| Time (minutes) | Relative viscosity (scale divisions) | | |
|---|---|---|---|
| | Test 1 | Comparison 1a | Comparison 1b |
| 0 | 17.5 | 17.5 | 17.5 |
| 10 | 17.5 | 13.5 | 17.5 |
| 16 | 16.5 | 11.5 | 17.5 |
| 21 | 15.5 | — | 17.5 |
| 27 | — | 9.5 | — |
| 30 | — | 8.5 | 17.5 |
| 33 | — | 8.0 | — |
| 39 | 13.5 | — | — |
| 47 | 12.5 | — | 17.5 |
| 62 | — | 4.5 | — |
| 78 | 9.5 | — | 17.5 |

EXAMPLE 2

10 g of 2-ethylhexanoic acid were dissolved in 90 g of dry methanol. 0.42 g of this solution were combined with 2 g of solution B from Example 1 to give solution D.

10 g of sodium acetate were dissolved in 90 g of dry methanol. 0.24 g of this solution were combined with 1 g of solution B from Example 1 to give solution E.

10 g of p-toluene sulphonic acid were dissolved in 90 g of dry methanol. 0.22 g of this solution were combined with 2 g of a solution of 0.68 g of sodium methylate in 100 g of dry methanol to give solution F.

Test 1 was performed using solutions D to F instead of solution C. Table 2 shows the viscosity profile as a function of reaction time and the quantity of catalyst system used.

In all three cases, the gelation test after 10 minutes' reaction time resulted in no perceptible increase in viscosity. This means that the end-termination reaction had substantially occurred.

TABLE 2

The viscosity values are stated in scale divisions of the measuring device.

| (Time minutes) | Relative viscosity (scale divisions) | | |
|---|---|---|---|
| | Solution D | Solution E | Solution F |
| 0 | 18.5 | 17.5 | 17.5 |
| 6 | — | 17.5 | — |
| 7 | 19.0 | — | — |
| 8 | — | — | 17.5 |
| 11 | — | — | 17.0 |
| 15 | — | — | 16.5 |
| 16 | 18.5 | — | — |
| 22 | — | — | 15.5 |
| 27 | — | 16.0 | 15.5 |
| 30 | — | — | 14.5 |
| 33 | — | 15.5 | — |
| 43 | — | — | 14.5 |
| 48 | — | 14.5 | — |
| 61 | 15.0 | — | — |
| 79 | — | — | 11.5 |
| 108 | 14.5 | — | — |
| 110 | — | 12.0 | — |
| Quantity of Catalyst system used | 1.0 g | 0.51 g | 2.2 g |

It will be understood that the specification and examples are illustrative but not limitative of the present invention and that other embodiments within the spirit and scope of the invention will suggest themselves to those skilled in the art.

We claim:

1. In the production of a triorganyloxysilyl or organodiorganyloxysilyl end-terminated poly-(diorganosiloxane) by reacting an α,ω-dihydroxypoly(diorganosiloxane) with a tetraorganyloxysilane or organotriorganyloxysilane in the presence of at least one alkali metal hydroxide, alkali metal alkoxide or alkali metal silanolate as a catalyst, the improvement which comprises effecting the reaction also in the presence of additionally at least one alkali metal salt which is soluble in the reactive system and is selected from the group consisting of:
   a) formic acid or an optionally substituted, linear, branched or cyclic alkyl carboxylic acid or a polycarboxylic acid with 1 to 30 C atoms,
   b) an optionally substituted aromatic carboxylic acid,
   c) a semi-ester of carbonic acid of the formula $R^6$-O(CO)OH,
   d) an aryl or alkyl sulphonic acid of the formula $R^7$-$SO_2$-(OH) and
   e) an aryl or alkyl phosphonic acid of the formula $R^8$-PO-$(OH)_2$ wherein
   $R^6$, $R^7$, or $R^8$ designate an aliphatic or aromatic, optionally substituted hydrocarbon group with 1 to 10 atoms.

2. The process according to claim 1, wherein the α,ω-dihydroxypoly(diorganosiloxane) is of the formula

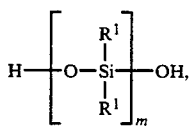

wherein
$R^1$ designates a methyl, vinyl, phenyl or 3,3,3-trifluoropropyl group, wherein different $R^1$ groups may be the same or different and
m designates such a number that corresponds to a polymer (I) viscosity between 0.01 to 1,000 Pa.s., the tetraorganyloxysilane or organotriorganylsilane is of the formula $$R^2{}_n Si(OR^3)_{4-n} \quad (II),$$

wherein
$R^2$ designates an optionally substituted alkyl, alkenyl or aryl group with 1 to 10 C atoms,
$R^3$ designates an optionally substituted aliphatic or cycloaliphatic hydrocarbon group with 1 to 6 C atoms and
n designates the number 0 or 1,
about 1 to 20 moles of organyloxysilane are employed per OH-equivalent of α,ω-dihydroxypoly (diorganosiloxane), the catalyst comprises an alkali metal hydroxide, alkali metal alkoxide or alkali metal silanolate and is present in about 0.05 to 1000 parts by weight of alkali metal per million parts by weight of α,ω-dihydroxypoly (diorganosiloxane), and the alkali metal salt is present in about 0.25 to 4 moles per mole of catalyst.

* * * * *

UNITED STATES PATENT AND TRADEMARK OFFICE
CERTIFICATE OF CORRECTION

PATENT NO. : 5,310,844
DATED : May 10, 1994
INVENTOR(S) : Weber, et al.

It is certified that error appears in the above-indentified patent and that said Letters Patent is hereby corrected as shown below:

Title Page   Under " [22] " insert -- [30] Foreign Application Priority Date:
             March 6, 1992 [DE] Germany..... 42 07 212.3 --

Signed and Sealed this

Twenty-ninth Day of August, 1995

Attest:

BRUCE LEHMAN

Attesting Officer        Commissioner of Patents and Trademarks